United States Patent [19]

Hara et al.

[11] 4,285,927
[45] Aug. 25, 1981

[54] PRODUCTION OF SULFURIC ACID USING A $K_2SO_4$, $V_2O_5$, DIATOMACEOUS EARTH CATALYST

[75] Inventors: Haruichi Hara, Toyonaka; Toshihide Kanzaki, Takatsuki; Hisanao Motomuro; Akiyoshi Adachi, both of Suita, all of Japan

[73] Assignee: Nippon Shokubai Kagaku Kogyo Co., Ltd., Osaka, Japan

[21] Appl. No.: 828,594

[22] Filed: Aug. 29, 1977

Related U.S. Application Data

[62] Division of Ser. No. 689,807, May 25, 1976, abandoned.

[30] Foreign Application Priority Data

May 29, 1975 [JP] Japan .................................. 50-63492

[51] Int. Cl.³ ...................... C01B 17/74; C01B 17/98; B01J 27/02; B01J 29/16
[52] U.S. Cl. .................................. 423/535; 252/440; 252/456; 423/522
[58] Field of Search ............... 423/522, 533, 534, 535, 423/538; 252/456, 440

[56] References Cited

U.S. PATENT DOCUMENTS

| | | | |
|---|---|---|---|
| Re. 19,282 | 8/1934 | Slama | 423/535 |
| 1,862,825 | 6/1932 | Laury | 423/535 |
| 1,880,678 | 10/1932 | Beardsley | 423/522 |
| 2,016,135 | 10/1935 | Cummings | 423/538 |
| 2,029,376 | 2/1936 | Joseph | 423/535 |
| 2,799,560 | 7/1957 | Davies | 423/533 |
| 3,282,645 | 11/1966 | Mandelik | 423/535 |
| 3,300,280 | 1/1967 | Terminet | 423/535 |
| 3,875,294 | 4/1975 | Reh et al. | 423/522 |

FOREIGN PATENT DOCUMENTS

1642907 5/1971 Fed. Rep. of Germany .
419068 2/1967 Switzerland .

OTHER PUBLICATIONS

Mandelik et al., Selective Oxidization in Sulfuric and Nitric Acid Plants: Current Practices, Chemical Engineering, Apr. 25, 1977, pp. 123–130.
Riegel, E. R., Industrial Chemistry, Reinhold Publishing Co., N.Y., N.Y., 1949, pp. 31–33.

Primary Examiner—Gary P. Straub
Attorney, Agent, or Firm—Cushman, Darby & Cushman

[57] ABSTRACT

A process for the production of sulfuric acid for using a gas containing sulfur dioxide in a high concentration which comprises using a catalyst consisting of vanadium pentoxide as a main catalytic component, potassium sulfate as a promotor and a diatomaceous earth carrier, wherein a ratio of $K_2O(mol)/V_2O_5(mol)$ is 3.8 to 5.5, $V_2O_5$ content is 5.5 to 7.5% by weight and sum of a value of said ratio and the $V_2O_5$ content (% by weight) is 9.3 to 11.

7 Claims, 4 Drawing Figures

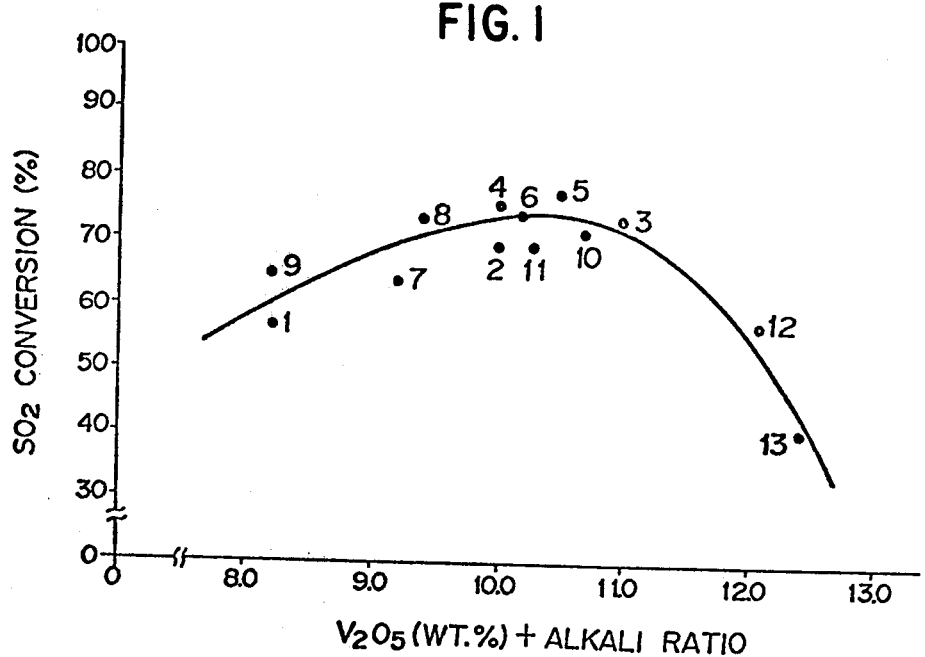
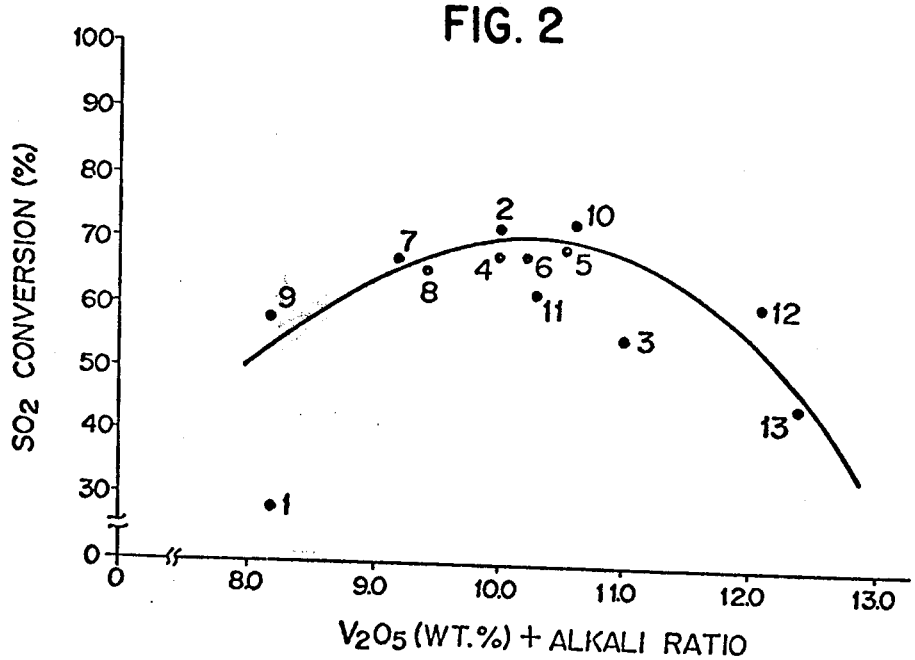

PRODUCTION OF SULFURIC ACID USING A K$_2$SO$_4$, V$_2$O$_5$, DIATOMACEOUS EARTH CATALYST

This is a division, of application Ser. No. 689,807 May 25, 1976 now abandoned.

BACKGROUND OF THE INVENTION

The present invention relates to a heat resistant catalyst for the production of sulfuric acid which can be used especially for a high SO$_2$ concentration gas and can be maintained oxidation activity at a high temperature for a long period of time in addition to oxidation activity at a usual low temperature in a catalytic oxidation of sulfur dioxide (SO$_2$) to sulfur trioxide (SO$_3$). More particularly, it relates to a heat resistant catalyst composition which is suitable for using a high SO$_2$ concentration gas maintaining oxidation activity at both low and high temperatures for a long period of time by specifying a composition ratio of vanadium pentoxide and potassium sulfate and the like.

Processes for the catalytic production of sulfuric acid by using vanadium catalysts have been succeeded industrially from old time. Catalytic oxidation reaction yield of SO$_2$ to SO$_3$ by these vanadium catalysts was about 95 mol % by approximately 1955, but it became 98 mol % by improvements in the art afterwards. Further double absorption process was introduced in 1962 and the yield became 99.5 mol %. And plants which give 99.9 mol % of yield are under construction now as further improved process. Therefore, unoxidized rest part of SO$_2$ gas decreased from 5 mol % to 2 mol %, further to 0.5 mol % and to 0.1 mol % in the above described improved cases.

Vanadium catalysts used in these processes, however, are changed little in components and compositions thereof for recent 20 years, so the above described improvement of oxidation yield can be deemed as merely a result of the improvement of reaction system. This fact means that the SO$_2$ conversion could reach somewhat 95% even if the catalyst currently used in newest reaction process is applied to a conventional single absorption and a catalytic converter of two catalyst layers.

On the contrary, recently Wellman-Load Process has been developed as one of an exhaust gas desulfurization process to obtain a SO$_2$ gas in a concentration of 100 mol %, so that an about 25 mol % of SO$_2$ containing gas which is obtained by mixing air as an oxygen source into the SO$_2$ gas can be used industrially as a raw material for producing sulfuric acid. That is to say, about three times of a high concentration gas in comparison with a concentration of a conventional raw gas, e.g., a 7 mol % concentration SO$_2$ gas can be used, so the same amount of sulfuric acid can be produced using one third volume of feed gas, therefore cost of its plant construction has considerably decreased. For this purpose, however, it is required for the vanadium catalyst used for the process to have a property so as to resist a higher reaction temperature than a conventional reaction temperature and maintain its activity for a long period of time in addition to a conventional activity performance.

The reason is that the reaction gas temperature elevates about 2.0° C. per increase of 1.0 mol % of conversion in case of using a gas containing 7.0 mol % of SO$_2$ and the elevation of temperature is proportional to approximately SO$_2$ concentration, because the oxidation reaction of sulfur dioxide is exothermic and it is carried out adiabatically in an industrial reactor. Furtermore, if a raw gas containing SO$_2$ in a concentration of 21 mol % is used, the gas temperature elevates 6° C. per increase of 1 mol % of conversion. In an industrial reactor, the vanadium catalyst is used by packing in it dividing three or four layers, but an inlet gas temperature of the first layer is usually controlled to about 430° C. Thus, if 7.0 mol % of SO$_2$ containing gas is used as raw material and it is reacted in a 75 mol % of conversion in the first layer as usual, the outlet gas temperature of the first layer becomes 580° C. ($=2\times75+430$) on calculation in case of neglecting heat loss in the reactor. However, when 21 mol % of SO$_2$ containing gas is used, it should be kept in mind that the outlet gas temperature of the first layer becomes high temperature such as 670° C. ($=6\times40+430$), even if the conversion in the first layer is controlled down to only 40 mol %.

Judging from former common sense, it has been thought that it is impossible to adopt such high outlet gas temperature of the catalyst layer with respect to heat resistance of a material of the reactor. But good heat resistant metallic materials have been applied recently, so a catalyst which can be resistant to a high temperature of more than 650° C. and can maintain its activity for a long period of time is required as a catalyst to be charged into the first or second layer of the reactor.

In an oxidation reaction of SO$_2$ to SO$_3$, the higher the temperature becomes, the lower an equilibrium conversion which can be reached theoritically becomes in spite of existence of the catalyst. Thus, once the reaction in each catalyst layers reach to the equilibrium at each temperature respectively it cannot proceed no more, even if excess catalyst is packed into the layers. Therefore, a reacted gas approached to this point is cooled to approximately an initial inlet temperature by means of a heat exchanger and then introduced into the next catalyst layer to proceed the reaction.

From the above described facts, even the catalyst which is used for a process using high concentration raw gas containing 21% by volume of SO$_2$ should have superior activity at a low inlet temperature in a conventional catalyst layer. Especially in case of using a SO$_2$ gas from Wellman-Load Process which is applied to desulfurization in a power generating plant, the load change at night and day is great and low concentration gas containing less than 7% by volume of SO$_2$ should be occasionally used based on shortage of the raw gas. Therefore, the activity at the low temperature is required without fail. As a catalyst for the production of sulfuric acid having durable activity at a high temperature, Fe$_2$O$_3$ granular catalyst is well known from old times, but its oxidation activity at temperature of lower than 500° C. is very poor, so it cannot be used for the production of sulfuric acid. Further, although a platinum catalyst has high activity at both high and low temperatures, it cannot be used actually, because it is expensive and its activity decreases by poisoning with arsenium.

SUMMARY OF THE INVENTION

Accordingly, an object of the present invention is to provide an improved heat resistant catalyst for the production of sulfuric acid.

An another object of the present invention is to provide a catalyst for the production of sulfuric acid which can catalytically oxidize a raw gas containing SO$_2$ in a high concentration to yield SO$_3$ effectively and can maintain high activity at both low and high temperature zones for a long period of time.

A further object of the present invention is to provide a process for the production of sulfuric acid from a gas containing SO$_2$ in a high concentration.

These objects can be attained by a heat resistant catalyst for the production of sulfuric acid for using a gas containing sulfur dioxide in a high concentration which comprises vanadium pentoxide as a main catalytic component, potassium sulfate as a promotor and at least one carrier selected from the group consisting of silica sol and diatomaceous earth, wherein a ratio of K$_2$O(mol)/V$_2$O$_5$(mol) is 3.8 to 5.5, V$_2$O$_5$ content is 5.5 to 7.5% by weight and sum of a value of said ratio and the V$_2$O$_5$ content (% by weight) is 9.3 to 11.

A catalyst for the production of sulfuric acid currently industrially used comprises vanadium pentoxide as a main catalytic component, an alkali metal sulfate as a promotor and diatomaceous earth, silica sol or other insoluble infusible fine powdered inorganic compound as a carrier, and other component can be deemed to be substantially an impurity. And their contents are in a range of 5 to 9% of V$_2$O$_5$, 9 to 13% of K$_2$O, 1 to 5% of Na$_2$O, 10 to 20% of SO$_3$ and 50 to 70% of the carrier component (mainly SiO$_2$).

We have prepared a various catalyst specimens varying contents of each components shown by such conventional catalysts, especially their mutual content ratios in a wide range by the same procedure, measured their activities and examined the results in comparison with each other to find that the above described catalyst in accordance with the present invention. And we have found that new catalyst has superior to the conventional one in a durable activity at a high temperature and has a similar activity at a low temperature in comparison with the conventional one.

The catalyst in accordance with the present invention is characterized when a raw gas containing 10 to 25% by volume, especially 15 to 25% by volume of sulfur dioxide is used catalytically with molecular oxygen in a gas phase to yield sulfur trioxide effectively in both low and high temperature zones.

BRIEF DESCRIPTION OF THE DRAWINGS

The present invention will be understood best in connection with the accompanying drawings wherein;

FIG. 1 is a graph obtained by plotting a SO$_2$ conversion to a sum of a value of V$_2$O$_5$ content (% by weight) and an alkali ratio of K$_2$O(mol)/V$_2$O$_5$(mol) on catalyst specimens prior to heat treatment, and the alkali ratio of each specimen is hereinafter referred to TABLE 1, FIG. 2 is a graph obtained by plotting a SO$_2$ conversion to a sum of a value of V$_2$O$_5$ content (% by weight) for the same catalyst specimens after heat treatment.

DESCRIPTION OF THE PREFERRED EMBODIMENTS

Figure 3:
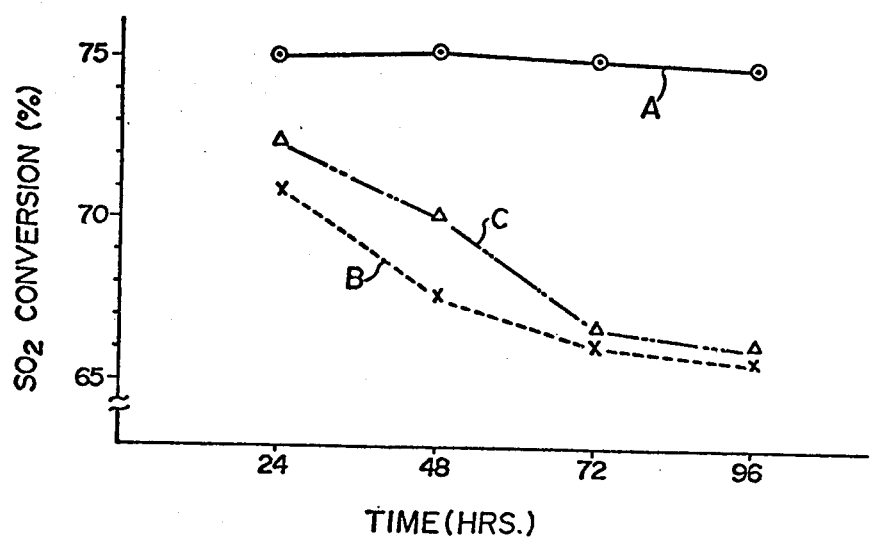
FIG. 3 is a graph showing a change of a conversion on standing in a high SO$_2$ concentration on catalyst specimens after heat treatment.

The catalyst in accordance with the present invention is in the range of 3.8 to 5.5, preferably 4 to 5 of a ratio of K$_2$O(mol)/V$_2$O$_5$(mol) (alkali ratio), 5.5 to 7.5% by weight, preferably 5.5 to 7% by weight of V$_2$O$_5$ content and 9.3 to 11, preferably 9.5 to 11 of sum of the value of the alkali ratio and the V$_2$O$_5$ content (% by weight). However, these numerals are merely calculated values shown the metals used in the finished catalyst in accordance with the present invention as an oxide thereof. Although it is thought that potassium sulfate in the catalyst, a part thereof also forms occasionally potassium hydrogen sulfate (KHSO$_4$) or potassium pyrosulfate (K$_2$S$_2$O$_7$) depending on calcination condition and the like. Sodium may usually be incorporated with the potassium sulfate based on a potassium source originated from an industrial raw material in an amount of at most 5% by weight of sodium as Na$_2$O to sum of K$_2$O and Na$_2$O. Sodium sulfate is desired as little as possible, because it is apt to expand under catching water of crystallization so that the catalyst is apt to break down and its mechanical strength decreases by absorbing water at a low temperature of storage or suspension of operation, but it is permitted provided within the above mentioned range. Further contents of iron (Fe$_2$O$_3$), aluminum (Al$_2$O$_3$) and other heavy metal oxides are desired as little as possible. Therefore, the above mentioned K$_2$O/V$_2$O$_5$ is calculated under converting sodium contained in potassium into the potassium.

Although the catalyst of the present invention can be prepared by various methods, it may be prepared, for example, as follows: a compound which is soluble in alkali hydroxide solution such as vanadium pentoxide, ammonium metavanadate, etc. as a vanadium source is dissolved into a known concentration of an aqueous potassium hydroxide solution to prepare a concentrated aqueous solution so that the above mentioned K$_2$O/V$_2$O$_5$ ratio becomes a desired value. The aqueous solution is controlled to weak alkaline (pH=9–12) and is diluted to an appropriate concentration at the same time by adding sulfuric acid and water. The appropriate concentration means one so that the catalyst shows a desired V$_2$O$_5$ content and have mechanical strength bearable for industrial use, when the diluted solution is incorporated with a carrier in a certain proportion and the catalyst in completed through the following whole procedure. A ratio of the appropriate concentration to the carrier has previously been determined by a preparatory test. The appropriate concentration of the diluted solution is mixed with the carrier in a proportion obtained by the preparatory test, the mixture thus obtained is molded to a tablet or grain by voluntary method, dried until water content becomes 6 to 12% by weight, and the molded grain is packed into a vessel and passed a gas containing 5 to 100% by volume of SO$_2$ to acidify the whole of the molded grain, then calcined at a temperature of 450° to 750° C. for 30 to 120 minutes to obtain a finished catalyst.

SO$_3$ content in the finished catalyst thus obtained is 10 to 12% to the whole of the finished catalyst, although it varies to some extent depending on the above mentioned calcination conditions. On the contrary, SO$_3$ contact seems to be lower than that of various conventional catalysts which contain 9 to 20%, but the lower content, the lesser hydroscopic and safer in a treatment when the finished catalyst is packed into an industrial reactor. However, although the more SO$_3$ content, the more active in respect of catalytic activity, if the catalyst is packed into a reactor, heated the catalyst packed layer with hot dry air and then introduced a raw material containing SO$_2$, SO$_3$ content is elevated until it is reached to equilibrium with SO$_3$ in the gas phase under absorbing SO$_3$ yielded on oxidation into the catalyst within 2 to 3 hours, so an amount of $SO_3$ contained initially in the catalyst is not open to discussion.

The catalyst of the present invention may be any shapes of sphere or cylindrical form. Its dimension is generally 3 to 15 mm, preferably 4 to 10 mm of an average diameter and 1 to 3 times, preferably 1.2 to 2.5 times of the length to the diameter in case of the cylindrical form, and generally 4 to 20 mm, preferably 5 to 15 mm of an average diameter in case of the sphere.

The catalyst thus prepared is packed into an industrial reactor and is contacted with a gas containing $SO_2$ in a high concentration such as 10 to 25% by volume, preferably 15 to 25% by volume and stoichiometrically excess amount of molecular oxygen at a catalyst layer inlet temperature of at least 420° C., preferably at least 440° C. and at a catalyst layer outlet temperature of at most 800° C., preferably at most 750° C. to oxidize $SO_2$ to $SO_3$ and the sulfur trioxide is contacted with a 97–98% of sulfuric acid to obtain a more than 98% of sulfuric acid.

EXAMPLES 1–13

Commercially available potassium hydroxide (KOH) containing about 5% by weight of sodium hydroxide (NaOH) as an impurity was dissolved into water to yield a 40% by weight of an aqueous potassium hydroxide solution and vanadium pentoxide was dissolved into the solution so as to have an alkali ratio shown in TABLE 1 to prepare a concentrated solution. The solution was alkalized weakly (pH about 12) and diluted to an appropriate concentration at the same time by addition of about 50% of sulfuric acid and water. The appropriate diluted concentration means necessary one so that the catalyst shows a desired $V_2O_5$ content and have mechanical strength bearable for industrial use, when the diluted solution is incorporated with a carrier in a certain proportion and the catalyst is completed through the following whole procedure. A ratio of the appropriate concentration to the carrier has previously been determined by a preparatory test.

The appropriately diluted aqueous solution was mixed with diatomaceous earth (70% by weight of to the whole was 2–30 microns of particle size) in a proportion obtained by the preparatory test, molded by rubbing in a stainless steel plate having many holes of 5.0 mm in diameter and 5.0 mm in depth and dried until water content becomes 6 to 8% by weight. This molded grain packed into a vessel was acidified by passing $SO_2$ gas and then calcined at a temperature of 650°±10° C. for 60 to 70 minutes to obtain a finished catalyst.

Then, in order to examine the decrease of activity during the reaction of a gas containing $SO_2$ in a high concentration at both low and high temperatures on each catalyst shown in TABLE 1, they were divided into two equal parts and one of them were heat treated as follows: each catalyst was packed into a quartz reactor tube having 30 mm of an inner diameter and then introduced gas containing 17% by volume of $SO_2$ balanced with dried air at a space velocity of 700 $hr^{-1}$ for 12 hours maintaining a temperature of 750° C. of a catalyst layer inlet temperaure in an electric furnace having 1,000 mm of length.

Conversion of $SO_2$ to $SO_3$ were measured on both untreated and heat treated catalysts thus obtained and shown in TABLE 1 by the following procedure. Each 41 grains (volume about 7.5 cc) of catalyst was respectively packed into a heat resistant glass (tradename: "Pyrex") reactor having 35 mm of an inner diameter, whole of the catalyst layers were heated at a homogeneous temperature zone of an electric furnace, a feed gas containing 17% by volume of $SO_2$ balanced with dry air was passed through the catalyst layer at a space velocity of 1,850 $hr^{-1}$ maintaining a catalyst layer inlet temperature at a desired one to react continuously for 48 hours and then conversions were calculated by measuring $SO_2$ concentration in gases at both inlet and outlet of the catalyst layer to examine catalytic activities thereof. The results were summarized in TABLE 1.

TABLE 1

| EXAMPLE | catalyst composition | | $SO_2$ conversion | |
|---|---|---|---|---|
| | $V_2O_5$(wt. %) | alkali ratio | prior to heat treatment | after heat treatment |
| 1 | 6.2 | 2.0 | 56.0 | 18.2 |
| 2 | 5.9 | 4.1 | 70.1 | 73.4 |
| 3 | 9.0 | 2.0 | 72.8 | 56.0 |
| 4 | 6.0 | 4.0 | 75.0 | 70.2 |
| 5 | 5.5 | 5.0 | 76.7 | 70.0 |
| 6 | 6.2 | 4.0 | 74.5 | 68.6 |
| 7 | 5.7 | 3.5 | 63.1 | 67.0 |
| 8 | 5.9 | 3.5 | 72.4 | 65.9 |
| 9 | 4.2 | 4.0 | 63.8 | 57.7 |
| 10 | 6.7 | 4.0 | 71.0 | 73.0 |
| 11 | 5.3 | 5.0 | 68.4 | 62.5 |
| 12 | 8.1 | 4.0 | 56.4 | 61.8 |
| 13 | 6.4 | 6.0 | 40.3 | 45.9 |

FIGS. 1 and 2 were prepared from measured shown in TABLE 1. FIG. 1 shows activity of catalyst prior to heat treatment and FIG. 2 shows activity of catalyst after heat treatment. That is to say, we were able to find a regularity by drawing a curve of $SO_2$ conversion to sum of the alkali ratio and $V_2O_5$ content (% by weight). We have here found an aimed catalyst for the production of sulfuric acid in accordance with the present invention which has durability of an activity during high temperature reaction and is not inferior to a conventional catalyst for industrial use in an activity at low temperature. Analized values on the catalysts satisfy a relation among these three composition in which the alkali ratio is 3.8 to 5.5, preferably 4 to 5, $V_2O_5$ content is 5.5 to 7.5% by weight, preferably 6 to 7% by weight and sum of the alkali ratio and $V_2O_5$ content (% by weight) is 9.3 to 11, preferably 9.5 to 11.

EXAMPLES 14–16

Catalyst A as one obtained by using industrially and catalysts B and C as conventional typical industrial ones shown in TABLE 2 were prepared by similar methods to the above EXAMPLES 1 to 13. And their activity drops during the reaction at a high temperature were examined by reacting high $SO_2$ concentration gas respectively using both heat treated and untreated catalysts for a long time. Size of all industrial catalysts had 8.0 mm±0.1 mm of a diameter and 11.0 mm ±1.0 mm of a length and heat treatment was carried out using a mixed gas containing 20% by volume of $SO_2$ balanced with dry air by a similar method to EXAMPLES 1 to 13.

Activity test of the catalyst was carried out as follows: 17 grains (packed volume was about 14.0 cc) of catalyst was packed into a stainless steel reactor having 40.3 mm of inner diameter and the reactor was immersed in a molten salt bath maintained at a temperature of 450° C. A mixed gas containing 20% by volume of $SO_2$ balanced with dry air was continuously passed through the reactor at a space velocity of 1,000 $hr^{-1}$ for several days and measured a change of concentration of SO₂ at both inlet of catalyst layer and outlet every 24 hours and calculated the conversion. The results are summarized in TABLE 2.

TABLE 2

| EXAMPLE | catalyst specimens | catalyst composition | | SO₂ conversion (%) | | | | after heat treatment | | | |
|---|---|---|---|---|---|---|---|---|---|---|---|
| | | $V_2O_5$ (wt. %) | alkali ratio | after 24 hrs | after 48 hrs | after 72 hrs | after 96 hrs | after 24 hrs | after 48 hrs | after 72 hrs | after 96 hrs |
| 14 | catalyst A | 6.0 | 4.0 | 75.3 | 75.5 | 75.0 | 75.0 | 77.6 | 77.7 | 77.7 | 76.9 |
| 15 | catalyst B | 6.3 | 2.8 | 70.6 | 67.8 | 66.2 | 66.0 | 78.1 | 77.8 | 77.3 | 76.1 |
| 16 | catalyst C | 7.5 | 2.8 | 72.5 | 70.0 | 66.7 | 66.2 | 75.0 | 74.9 | 71.7 | 70.2 |

Figure 4:
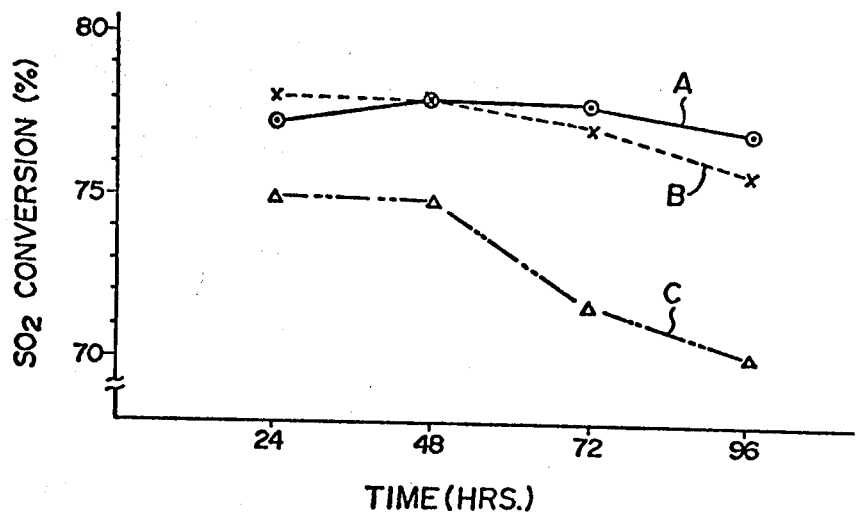
FIG. 4 is a graph showing a change of a conversion on standing in a high SO$_2$ concentration on catalyst specimens prior to heat treatment.

Change of the conversions on the catalyst after heat treatment and the catalyst without heat treatment are respectively shown in FIGS. 3 and 4. From the results in FIGS. 3 and 4, it has been found that the catalyst A in accordance with the present invention is considerably superior to catalysts B and C as controls in durability of activity during usage with high SO₂ concentration gas at both high temperature and low temperature of inlet gas introduced to catalyst layers of an industrial convertor.

EXAMPLE 17

A process where a cylindrical catalyst having 6 mm of diameter and 8.5 mm of length and the same composition as one of Example 2 is applied to as industrial convertor for the production of sulfuric acid (capacity is 100 tons of 100% sulfuric acid per day) and a gas containing 20% by volume of SO₂ and 16.6% by volume of molecular oxygen which is obtained by diluting 100% of SO₂ with air is used to obtain more than 95 mol % of final conversion of SO₂ and its results are shown as follows:

4740 Nm³/hr at normal temperature and pressure of the above mentioned raw gas is fed to the first catalyst layer in the convertor in which 0.50 m³ of the catalyst is charged at an inlet temperature of 440° C. to obtain respectively 690° C. and 50 mol % of an outlet temperature and a SO₂ conversion. The outlet gas is cooled down by introducing about 1240 Nm³/hr of the raw gas having a temperature of 50° C. and the mixed gas thus cooled is fed to the second catalyst layer in which 0.9 m³ of the same catalyst is charged at an inlet temperature of 440° C. to obtain respectively 625° C. and 68 mol % of an outlet temperature and a SO₂ conversion. Then the outlet gas of the second catalyst layer is cooled down by introducing about 1500 Nm³/hr of the raw gas having a temperature of 50° C. and the mixed gas thus cooled is fed to the third catalyst layer in which 1.50 m³ of the same catalyst is charged at an inlet temperature of 440° C. to obtain respectively 590° C. and 76 mol % of an outlet temperature and a SO₂ conversion. Further, the outlet gas of the third catalyst layer is cooled down to 440° C. by means of a heat exchanger and is fed to the fourth catalyst layer (amount of catalyst: 2.30 m³) to obtain respectively 530° C. and 89 mol % of an outlet temperature and a SO₂ conversion. Then the outlet gas of the fourth catalyst layer is cooled down to 440° C. by means of a heat exchanger and is fed to the fifth catalyst layer (amount of catalyst: 3.0 m³) to obtain respectively 470° C. and more than 95 mol % of an outlet temperature and a SO₂ conversion. The outlet gas from the convertor is absorbed in 97–98% sulfuric acid at an absorber and a SO₂ concentration remained in the rest gas becomes 1.398%. When the SO₂ is recovered by mixing into an original feed gas from a desulfurization process, a SO₂ concentration of the gas exhausted corresponds to less than 50 ppm.

The outlet temperatures of both first and second catalyst layers in the above mentioned results are respectively 690° C. and 625° C., but the surface temperature of the catalyst in the reaction zone is considerably higher than these values, so the catalyst used in both first and second catalyst layers should be able to resist at a temperature of at least 750° C. and to maintain its oxidation activity for a long period of time.

What is claimed is:

1. A process for the production of sulfuric acid comprising subjecting a gas containing 12 to 25% by volume of sulfur dioxide and more than the stoichiometric amount of molecular oxygen to gas phase catalytic oxidation reaction in the presence of a catalyst which consists of vanadium pentoxide, potassium sulfate and diatomaceous earth, wherein the ratio of K₂O(mol)/V₂O₅(mol) is 3.8 to 5.5, V₂O₅ content is 5.5 to 7.5% by weight and the sum of the value of said ratio and the V₂O₅ content (% by weight) is 9.3 to 11, said reaction being carried out at a temperature of at least 420° C. in the catalyst layer inlet and at a temperature of at most 800° C. in the catalyst layer outlet.

2. A process according to claim 1 wherein the ratio of K₂O(mol)/V₂O₅(mol) is 4 to 5, the V₄O₅ content is 5.5 to 7% by weight and the sum of said ratio and the V₂O₅ content (% by weight) is 9.5 to 11.

3. A process according to claim 1, wherein the gas phase catalytic oxidation reaction is carried out at a temperature of at least 440° C. in the catalyst layer inlet and at a temperature of at most 750° C. in the catalyst layer outlet.

4. A process according to claim 1, wherein the catalyst is used for the first layer in a convertor.

5. A process according to claim 1, wherein the catalyst is used for the first and second layers in a convertor.

6. A process according to claim 1 wherein the sulfur dioxide content is 15 to 25% by volume.

7. A process according to claim 6 wherein the catalyst is used for the first and second layers in a convertor.

* * * * *